United States Patent [19]

Bannink, Jr. et al.

[11] Patent Number: 4,912,594

[45] Date of Patent: Mar. 27, 1990

[54] INTEGRAL LIGHTNING PROTECTION REPAIR SYSTEM AND METHOD FOR ITS USE

[75] Inventors: Engbert T. Bannink, Jr., Auburn; Glenn O. Olson, Seattle, both of Wash.

[73] Assignee: The Boeing Company, Seattle, Wash.

[21] Appl. No.: 224,230

[22] Filed: Jul. 22, 1988

Related U.S. Application Data

[63] Continuation of Ser. No. 926,900, Nov. 3, 1986, abandoned.

[51] Int. Cl.⁴ .............................................. H05F 1/02
[52] U.S. Cl. ..................................... 361/218; 361/117; 244/1 A
[58] Field of Search .................... 361/117, 216–218; 244/1 A, 121, 126, 136

[56] References Cited

U.S. PATENT DOCUMENTS 4,352,142  9/1982  Olson ................................... 361/218
4,502,092  2/1985  Bannick, Jr. et al. .............. 361/218
4,628,402  12/1986  Covey ................................. 361/218

*Primary Examiner*—Todd E. DeBoer
*Attorney, Agent, or Firm*—Seed and Berry

[57] ABSTRACT

An integral lightning protection system and method for its use with an aircraft graphite epoxy structure. If a repair is to be made to an aircraft composite structure, the hole to be repaired is first cleared of broken composite material and replaced with a bonded adhesive patch. Over the patch and conformal to the surface of the aircraft composite structure, a dielectric layer is placed, and over the dielectric layer, at least one metal-plated graphite fiber fabric ply is placed. Where fasteners are inserted through an aircraft composite panel, the heads of the fasteners are left flush with the outer surface of the composite material, and the composite material and fastener heads are adhesively covered by a dielectric cover. Thereafter, at least one metal-plated graphite fiber fabric ply is placed over the dielectric layer. Subsequently, either structure may be given a primer and paint coating.

16 Claims, 1 Drawing Sheet

U.S. Patent     Mar. 27, 1990     4,912,594
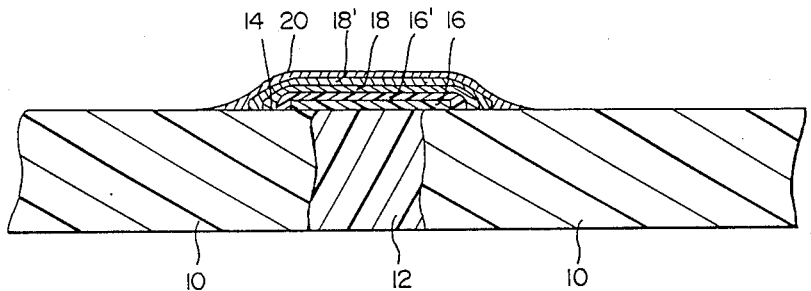
FIG. 1
FIG. 2
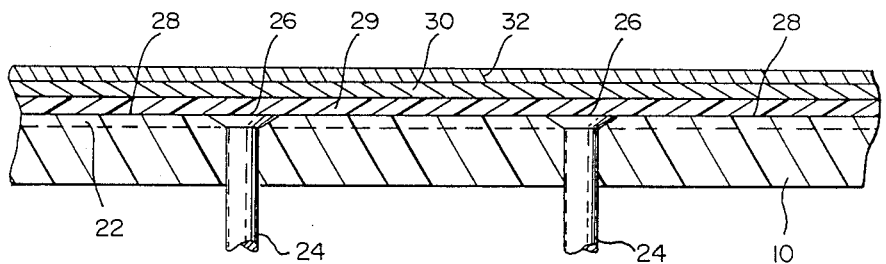

INTEGRAL LIGHTNING PROTECTION REPAIR SYSTEM AND METHOD FOR ITS USE

GOVERNMENT RIGHTS

The Government has rights in this invention.

This application is a continuation of U.S. patent application Ser. No. 926,900, filed Nov. 3, 1986, now abandoned under C.F.R. § 1.62.

TECHNICAL FIELD

The present invention relates to repairing lightning protection systems for aircraft, and more particularly, to repair systems and methods for providing lightning protection of aircraft structures made from composite structural components.

BACKGROUND ART

It is known that the graphite epoxy structural components used on aircraft are subject to natural lightning strike discharges. The most severe strikes are directed toward small-radius structures located at or near extending surfaces of the aircraft (wing tips, stabilizer tips, vertical tips, rudder, elevators, ailerons, engine cowlings, etc.). These locations are designated as "Zone 1" and are subjected to the initial attachment of the lightning channel. The initial attachment lightning stroke is characterized by a fast-rise, high-peak current ($2 \times 10^5$ amps) and a large energy transfer ($2 \times 10^6$ amps$^2$ sec). It can create severe structural damage to unprotected graphite epoxy structures (much more damage than to comparable aluminum structures).

Other parts of the structure will be subjected to lesser discharges, called "swept stroke lightning." These areas are designated as "Zone 2" and are located aft of the original attachment points. Swept stroke lightning also contains a fast-rise current, but with a $1 \times 10^5$ amp peak and an energy transfer of $0.25 \times 10^6$ amps$^2$ sec.

Particularly sensitive areas are integral fuel tanks and pressurized sections. Punctures cannot be tolerated in either area, but fasteners penetrating the skin and protruding into a fuel tank area have been shown to constitute a fuel ignition source even without a skin puncture. Unprotected fasteners are a preferred attachment point for the lightning and spark because the energy cannot be distributed fast enough into the surrounding graphite epoxy material (due to its low thermal and electrical conductivity).

Representative of the use of lightning protection systems in the prior art literature are U.S. Pat. Nos. 3,755,713; 4,479,163; and 4,502,092, assigned to The Boeing Company. Knitted wire mesh is utilized in the lightning protection system of U.S. Pat. No. 3,755,713, in contrast to the preferred embodiments of U.S. Pat. Nos. 4,479,163 and 4,502,092, which utilize nickel-plated graphite fibers. U.S. Pat. No. 3,755,713 shows only a decorative layer of knitted wire mesh, this layer providing insufficient coverage for any fastener heads. Further, this patent discloses no insulation between the fasteners and the structure since the reference structure is Fiberglas and, therefore, nonconductive.

U.S. Pat. No. 4,479,163 discloses an integral lightning protection system for composite aircraft skins. In this system, the graphite epoxy skin is covered by a nickel-plated graphite epoxy fabric comprising individual nickel-plated graphite fibers which are woven into the outer layer of fabric on the structural components requiring protection. Depending upon the protection desired (for Zone 1 or Zone 2), a varying percentage of the fiber tows in both the warp and fill direction of the fabric can be plated (for example, every second tow or every third tow).

When fasteners pierce through the skin, in order, for example, to attach internal structural members, such as L-beams, they are placed in holes through the skin, and reach into the interior of the compartment confined by the skin. The head of the fastener is at the same outer level as the graphite epoxy fabric ply. Thereafter, a coating of primer and paint can be applied to the fiber ply.

In one embodiment of U.S. Pat. No. 4,479,163, a fastener passes through the skin from the outside to the inside and the barrel of the hole through the skin is electrically insulated from the fastener by a cylindrical Fiberglas insulator. The graphite epoxy fiber fabric is then overlaid by a dielectric plastic strip, and the plastic strip is covered by a coating of primer and paint.

In U.S. Pat. No. 4,502,092, counterbore fasteners pass through the skin from outside to inside, where they are attached to structural elements. In various embodiments, the structural elements can be electrically insulated from the fastener, the structural elements themselves can be made from nonconductive material, and/or the internal panels, which are fastened in the interior of the compartment defined by the skin, can be electrically insulated from the structural support members attached to the skin. In each of the various embodiments of this patent, however, the fasteners are countersunk into the skin by forming a hole through the already-existing layer of graphite epoxy fiber fabric, inserting the fastener and filling the remaining hole with potting compound. A dielectric layer can be attached over the graphite epoxy fiber fabric and potting compound layer, followed by a coating of primer and paint.

For a variety of reasons, such as accidental damage or a later decision to add an internal component, it may be necessary to repair a graphite epoxy fiber fabric ply. The fabric ply need not have necessarily been either primed and painted or covered with one or more plies of metal-plated graphite epoxy fibers. It has been found in practice that following such a repair, the area of the repair is particularly susceptible to lightning strikes, even if the graphite epoxy structure is covered by at least one layer of metal-plated graphite fiber fabric. The reason is that state-of-the-art adhesives are nonconductive and, therefore, inhibit the dispersion of lightning currents out of the repair area. In this area of concentrated current, when the dielectric adhesive used to make the repair breaks down, internal and external arcing results, presenting a fuel ignition hazard and producing structural damage. It has also been found that for high-energy strikes, additional protection is required for fasteners penetrating the graphite epoxy skin already covered by a nickel-plated graphite fabric layer.

DISCLOSURE OF THE INVENTION

It is, therefore, an object of the present invention to provide a method and structure for repairing an aircraft graphite epoxy structure while providing lightning protection in the area of the repair.

It is another object of the present invention to provide a repair structure for a composite aircraft structure having a dielectric layer and an overlying metal-plated graphite fabric layer.

It is still another object of the present invention to provide a repair system for protecting fasteners inserted into aircraft composite structures in order to prevent the occurrence of destructive lightning currents.

Accordingly, a method of the present invention for repairing a damaged portion of an aircraft graphite epoxy structure having an outer surface comprises the steps of removing the damaged portion of the aircraft graphite epoxy structure, refilling the portion of the aircraft graphite epoxy structure with an adhesive to form a bonded patch, forming a dielectric layer over the outwardly directed surface of the bonded patch, and placing at least one metal-plated graphite fiber fabric ply over the dieletric layer.

In still another aspect of the present invention, a method for repairing a portion of an aircraft epoxy structure having an outer surface after a fastener has been inserted therein, said fastener being flush with a portion of the outer surface of the structure, comprises the steps of forming a dielectric layer over the portion of the outer surface of the structure and placing at least one outer metal-plated graphite fiber fabric ply over the dielectric layer.

In still another aspect, the present invention provides an integral lightning protection repair of an aircraft graphite epoxy structure having an outer surface with a hole in said outer surface needing to be repaired. The repair comprises a bonded adhesive patch in the hole, a dielectric layer placed over the outer surface of the bonded adhesive patch, and at least one outer metal-plated graphite fiber fabric ply placed over the dielectric layer.

In yet another aspect, the integral lightning protection system for an aircraft graphite epoxy structure, having a fastener inserted therein, comprises a graphite epoxy laminate structure with an outer surface, a fastener inserted into the outer surface of the laminate structure, the fastener being flush with a portion of the outer surface of the structure, a dielectric layer formed over the portion of the outer surface of the structure to which the fastener is flush, and at least one outer metal-plated graphite fiber ply placed over the dielectric layer.

BRIEF DESCRIPTION OF THE DRAWINGS

A full understanding of the present invention, and of its further objects and advantages and several unique aspects thereof, will be had from the following description when taken in conjunction with the accompanying drawings in which:

FIG. 1 is a cross-sectional view of a repaired composite structure showing the dielectric layer and ply of the present nickel-plated graphite fiber repair; and FIG. 2 is a cross-sectional view of repaired composite structure, including fasteners through the structure, showing the dielectric layer and ply of the present nickel-plated graphite fiber repair.

BEST MODE FOR CARRYING OUT THE INVENTION

Referring to FIG. 1, an aircraft graphite epoxy structure 10 having a hole 12 has been repaired from the direction of outside surface 14. As can be seen, hole 12 has been faired into the aircraft composite structure, thereby providing a large bonding area for the adhesive used to fill hole 12. The outer surface of the adhesive material is rendered flush with the extensions of skin 10. Outer surface 14 is then covered by dielectric layer 16, which can be made from a Fiberglas-preimpregnated layer approximately 9 or 10 milliinches (mils) thick. Dielectric layer 16 is placed over the bonded adhesive in hole 12 before the bonded adhesive has been cured, the bonded adhesive and dielectric layer curing together. If desired, more than one layer of dielectric fabric 16 (for example, layer 16') can be placed over surface 14, each layer extending beyond the last preceding layer by a nominal distance, for example, one inch. Subsequently, dielectric layer 16 can be overlaid by one or two layers of metal-plated graphite fabric 18 (for example, nickel-plated layer 18), while one ply of the metal-plated graphite fabric is adequate for Zone 2 applications. Zone 1 applications, which can experience 200 kiloamp currents, may require the use of two plies of metal-plated graphite fabric. Extra plies of graphite fabric can also extend beyond preceding plies by a nominal distance, such as one inch. Subsequently, the graphite fabric can be primed and coated in coating 20. Various alternatives to the use of Fiberglas in a dielectric layer are Mylar, Kapton (which is hard to bond to, requiring an acid treatment) and Tedlar (which can be used in the case of high curing temperatures, in the range of 250°–350° F.

The repair shown in FIG. 1 can be effected by first removing any damaged portion of the aircraft graphite epoxy structure, then refilling the portion of the structure with an adhesive to form a bonded patch, forming a dielectric layer over the outwardly directed surface of the bonded patch, and using at least one outer metal-plated graphite fiber fabric ply over the dielectric layer.

Referring to FIG. 2, an embodiment of the present invention is shown for use when fasteners must be inserted through the aircraft graphite epoxy composite skin in order to attach structural elements inside the aircraft. In particular, graphite epoxy layer 10, which may, for example, also be covered by a metal-plated fabric 22, must be drilled to admit the shanks of fasteners 24. Although FIG. 2 shows fasteners 24 with conical heads, other fasteners having other head shapes, or even no heads at all, may also be used. In aircraft graphite epoxy applications, fasteners are typically titanium. After the fasteners have been inserted, their upper surfaces 26 should be flush with the upper surfaces 28 of the aircraft graphite epoxy layer, which may also include the already-mentioned metal-coated graphite epoxy fiber fabric.

Next, surfaces 28 and 26 are overlaid by one or more dielectric layers 29. The dielectric layer may be adhered to surfaces 26 and 28 by means of a thin layer of adhesive, preferably having a thickness in the range of three to ten mils, and most desirably, five mils in thickness. At least one metal-plated graphite fabric layer 30 is placed over dielectric layer 29. Over layer 30 is priming and coating layer 32. Where more than one dielectric or graphic fabric layer is used, each layer can overlap the last preceding layer by, for example, one inch.

While various modifications can be made to the invention described above by one skilled in the art without departing from its scope and spirit, the invention is to be limited only by the following claims.

I claim:

1. A method of repairing a damaged portion of an aircraft graphite epoxy structure having an outer surface, comprising the steps of:
    (a) removing the damaged portion of the aircraft graphite epoxy structure;

(b) refilling the portion of the aircraft graphite epoxy structure from which the damaged portion was removed with an adhesive to form a bonded patch having an outwardly directed surface and an inwardly directed surface, the outwardly directed surface being flush with the outer surface of the aircraft graphite epoxy structure;

(c) forming a first dielectric layer in contact with the outwardly directed surface of the bonded patch; and (d) placing a first outer metal-plated graphite fiber fabric ply in contact with the first dielectric layer.

2. The method of claim 1, further comprising the step of placing a primer and paint coating over said first outer metal-plated graphite fiber fabric ply.

3. The method of claim 1 further comprising the step of (e) placing a second metal-plated graphite fiber fabric ply in contact with and extending beyond the first outer metal-plated graphite fiber fabric ply.

4. The method of claim 1 further comprising the step of (e) placing a second metal-plated graphite fiber fabric ply in contact with the first outer metal-plated graphite fiber fabric ply.

5. An integral lightning protection repair for an aircraft graphite epoxy structure having an outer surface with a hole in said outer surface needing to be repaired, comprising:
a bonded adhesive patch in the hole, said patch having an outer surface that is flush with the outer surface at the aircraft graphite epoxy structure;
a dielectric layer formed in contact with the outer surface of the bonded adhesive patch and at least a portion of the outer surface of the graphite epoxy structure; and
a first outer metal-plated graphite fiber fabric ply placed in contact with the dielectric layer.

6. The integral lightning protection repair of claim 5 further comprising a second metal-plated graphite fiber fabric ply contacting and extending beyond the first outer metal-plated graphite fiber fabric ply and coming into contact with a portion of the outer surface of the aircraft graphic epoxy structure.

7. The integral lightning protection repair of claim 5, further comprising a primer and paint coating over said first outer metal-plated graphite fiber fabric ply.

8. The integral lightning protection repair of claim 5 further comprising at least a second metal-plated graphite fiber fabric ply placed in contact with and extending beyond the first outer metal-plated graphite fiber fabric ply.

9. An integral lightning protection repair for an aircraft graphite epoxy structure having an outer surface with a hole in said outer surface needing to be repaired, comprising:
a bonded adhesive patch in the hole, said patch having an outer surface that is flush with the outer surface of the aircraft graphite epoxy structure;
a first dielectric layer formed in contact with the outer surface of the bonded adhesive patch and at least a portion of the outer surface of the graphite epoxy structure;
a second dielectric layer placed in contact with the first dielectric layer, the second dielectric layer extending beyond the first dielectric layer and contacting the outer surface of the aircraft graphite epoxy structure; and
a first outer metal-plated graphite fiber fabric ply placed in contact with the second dielectric layer.

10. A method of repairing a damaged portion of an aircraft graphite epoxy structure having an outer surface including a ply of metal-plated graphite fabric, comprising the steps of:
(a) removing the damaged portion of the aircraft graphite epoxy structure;
(b) refilling the portion of the aircraft graphite epoxy structure from which the damaged portion was removed with an adhesive to form a bonded patch having an outwardly directed surface and an inwardly directed surface, the outwardly directed surface being flush with the outer surface of the surrounding aircraft structure;
(c) forming a first dielectric layer in contact with the outwardly directed surface of the bonded patch; and
(d) placing a first outer metal-plated graphite fiber fabric ply in contact with the first dielectric layer, the first outer ply extending in contact with a portion of the metal-plated graphite fabric ply of the outer surface of the aircraft structure.

11. The method of claim 10 further comprising the step of (e) forming a second metal-plated graphite fiber fabric ply in contact with the first outer metal-plated graphite fiber fabric ply.

12. A method of repairing a damaged portion of an aircraft graphite epoxy structure having an outer surface, comprising the steps of:
(a) removing the damaged portion of the aircraft graphite epoxy structure;
(b) refilling the portion of the aircraft graphite epoxy structure from which the damaged portion was removed with an adhesive to form a bonded patch having an outwardly directed surface and an inwardly directed surface, the outwardly directed surface being flush with the outer surface of the aircraft graphite epoxy structure;
(c) forming a first dielectric layer in contact with the outwardly directed surface of the bonded patch, the first dielectric layer having an outer surface;
(d) forming a second dielectric layer in contact with the first dielectric layer; and
(e) placing an outer metal-plated graphite fiber fabric ply in contact with the second dielectric layer.

13. An integral lightning protection repair for an aircraft graphite epoxy structure having an outer surface with a hole in said outer surface needing to be repaired, comprising:
a bonded adhesive patch in the hole, said patch having an outer surface that is flush with the outer surface of the aircraft graphite epoxy structure;
a first dielectric layer formed in contact with the outer surface of the bonded adhesive patch and at least a portion of the outer surface of the graphite epoxy structure;
a second dielectric layer placed in contact with the first dielectric layer, the second dielectric layer contacting the outer surface of the aircraft graphite epoxy structure; and
a first outer metal-plated graphite fiber fabric ply placed in contact with the second dielectric layer.

14. A method of repairing a damaged portion of an aircraft graphite epoxy structure having an outer surface, comprising the steps of:
(a) removing the damaged portion of the aircraft graphite epoxy structure;
(b) refilling the portion of the aircraft graphite epoxy structure from which the damaged portion was removed with an adhesive to form a bonded patch having an outwardly directed surface and an inwardly directed surface, the outwardly directed surface being flush with the outer surface of the said aircraft graphite epoxy structure;
(c) forming a first dielectric layer in contact with the outwardly directed surface of the bonded patch, the first dielectric layer having an outer surface;
(d) forming a second dielectric layer in contact with the first dielectric layer; and
(e) placing an outer metal-plated graphite fiber fabric ply in contact with the second dielectric layer, the outer ply extending in contact with a portion of the metal-plated graphite fabric ply of the outer surface of the aircraft structure.

15. An integral lightning protection repair for an aircraft graphite epoxy structure having an outer surface containing a ply of metal-plated graphite fabric, the aircraft structure having a hole in said outer surface needing to be repaired, comprising:
 a bonded adhesive patch in the hole, said patch having an outer surface that is substantially flush with the outer surface of the surrounding aircraft structure;
 a first dielectric layer placed in contact with the outer surface of the bonded adhesive patch and at least a portion of the outer surface of the graphite epoxy structure;
 a second dielectric layer placed in contact with the outer surface of the first dielectric layer and at least a portion of the outer surface of the graphite epoxy structure; and
 a first outer metal-plated graphite fiber fabric ply placed in contact with the first and second dielectric layers, the fabric ply extending beyond the first and second dielectric layers to be in contact with the graphite fabric ply of the outer surface of the aircraft structure.

16. An integral lightning protection repair for an aircraft graphite epoxy structure having an outer surface containing a ply of metal-plated graphite fabric, the aircraft structure having a hole in said outer surface needing to be repaired, comprising:
 a bonded adhesive patch in the hole, said patch having an outer surface that is substantially flush with the outer surface of the surrounding aircraft structure;
 a dielectric layer placed in contact with the outer surface of the bonded adhesive patch and at least a portion of the outer surface of the graphite epoxy structure; and
 a first outer metal-plated graphite fiber fabric ply placed in contact with the dielectric layer, the fabric ply extending to be in contact with the graphite fabric ply of the outer surface of the aircraft structure.

* * * * *